United States Patent [19]
Aoyagi et al.

[11] Patent Number: 5,202,585
[45] Date of Patent: Apr. 13, 1993

[54] ELECTRONIC DEVICE INCLUDING IMPROVED CONNECTION DEVICE

[75] Inventors: Yoshio Aoyagi; Mayumi Satoh, both of Saitama, Japan

[73] Assignee: Pioneer Electronic Corporation, Tokyo, Japan

[21] Appl. No.: 900,788

[22] Filed: Jun. 22, 1992

Related U.S. Application Data

[63] Continuation of Ser. No. 605,328, Oct. 30, 1990, abandoned.

[30] Foreign Application Priority Data

Mar. 9, 1990 [JP] Japan .................... 2-56602

[51] Int. Cl.⁵ .................... H01H 7/00; H04B 1/08; B60R 11/02
[52] U.S. Cl. .................... 307/116; 307/10.1; 307/134; 307/141; 455/349; 369/11; 341/24; 200/50 A
[58] Field of Search ............ 200/50 R, 50 A, 61.58 R; 307/134, 116, 141, 10.1; 369/1, 11, 19, 21; 455/345–349; 361/346, 391, 395, 399, 170; 340/711; 341/22, 24, 26; 84/423 R

[56] References Cited

U.S. PATENT DOCUMENTS

| | | | |
|---|---|---|---|
| 3,814,948 | 6/1974 | Schuchmann et al. | 307/141 |
| 4,143,417 | 3/1979 | Wald et al. | 340/711 X |
| 4,733,100 | 3/1988 | Nusairat et al. | 455/345 X |
| 4,734,896 | 3/1988 | Soma et al. | 340/568 |
| 4,908,523 | 3/1990 | Snowden et al. | 307/66 X |
| 4,945,335 | 7/1990 | Kimura et al. | 455/348 |
| 4,947,457 | 8/1990 | Shin | 455/348 |
| 4,952,932 | 8/1990 | Sugino et al. | 341/22 |
| 5,020,151 | 5/1991 | Sampei et al. | 361/391 X |

FOREIGN PATENT DOCUMENTS

| | | |
|---|---|---|
| 365109 | 1/1989 | European Pat. Off. |
| WO90/09091 | 8/1990 | PCT Int'l Appl. .................. 307/141 |

*Primary Examiner*—A. D. Pellinen
*Assistant Examiner*—Fritzm Fleming
*Attorney, Agent, or Firm*—Sughrue, Mion, Zinn, Macpeak & Seas

[57] ABSTRACT

An electronic device has an operating section having a plurality of input keys. The operating section is detachably connected to a body of the device in such a manner that the contacts of the operating section are electrically connected to the contacts of the body when the operating section is connected to the body. The body includes a connection detecting section for detecting the connection of the operating section to the body to output a connection detection signal; and a control section for making the connection of the contacts of the body and the contacts of the operating section effective a predetermined period of time after provision of the connection detection signal.

5 Claims, 2 Drawing Sheets

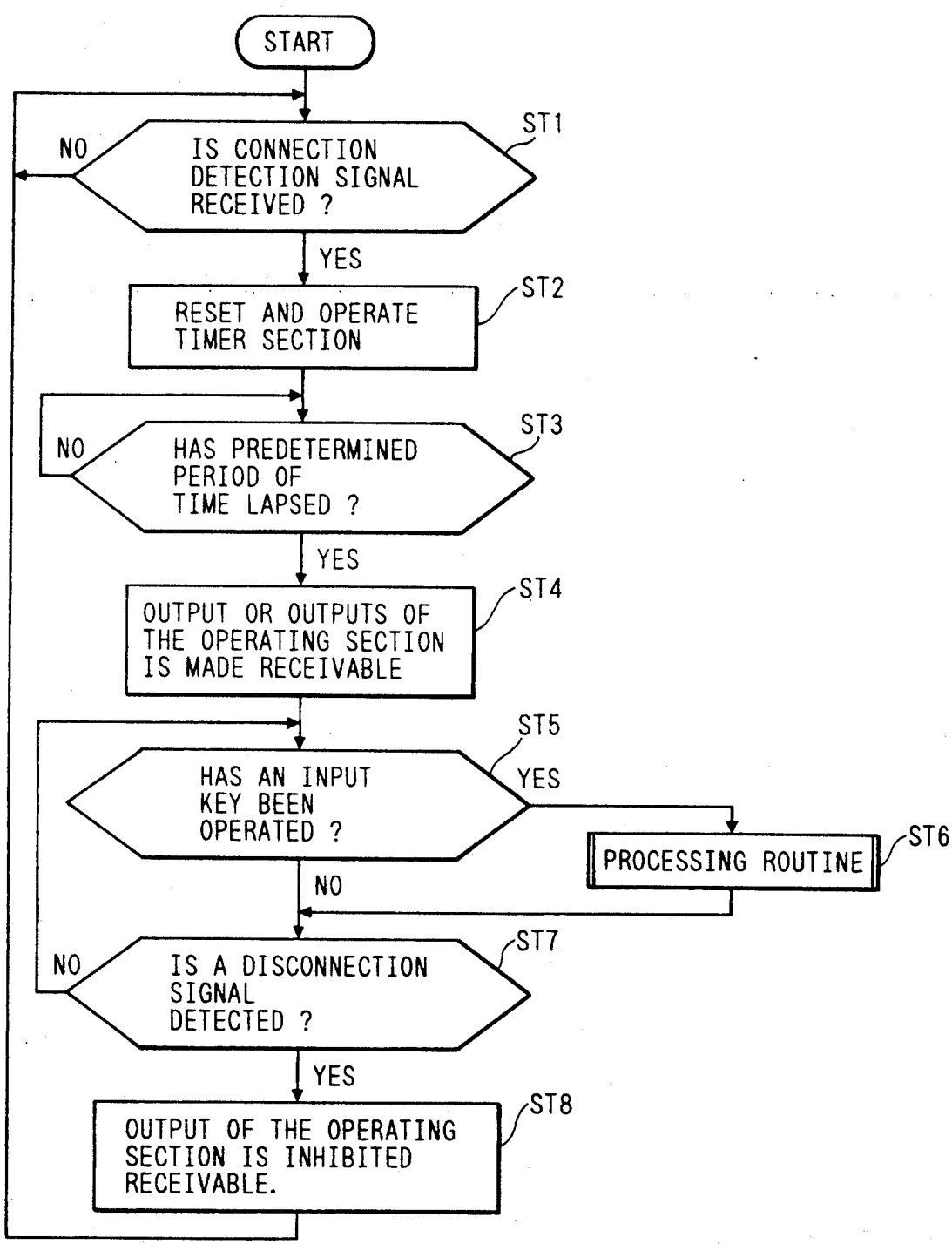

ELECTRONIC DEVICE INCLUDING IMPROVED CONNECTION DEVICE

This is a continuation of application Ser. No. 07/07/605,328 filed Oct. 30, 1990, now abandoned.

BACKGROUND OF THE INVENTION

This invention relates to an electronic device having an operating section which has a plurality of input keys and which is detachably connected to a body of the electronic device in such a manner that its contacts are electrically connected to the contacts of the body when the operating section is connected to the body.

An operating section of the electronic device, such as a disk player for use in a vehicle, has a plurality of input keys and is detachably connected to a body of the device in such a manner that the operating section's contacts are electrically connected to the contacts of the body when the operation section is connected to the body. The operating section can be operated as desired by operating the input keys of the operating section connected to the body.

The conventional electronic device is designed as described above. Therefore, when the operating section is connected to the body, its contacts are electrically connected to the contacts of the body, so that the outputs provided by operating the input keys of the operating section are received by the body.

Hence, if an input key or keys are operated accidentally while the operating section is being connected to the body, then the electronic device may be operated unintentionally.

SUMMARY OF THE INVENTION

An object of this invention is to eliminate the above-described difficulty accompanying a conventional electronic device such as a disk player on a vehicle. More specifically, an object of the invention is to provide an electronic device in which, if the input keys of the operating section are operated accidentally or unintentionally while the operating section is being connected to the body, the electronic device is not allowed to operate.

In an electronic device according to the invention, its body comprises: connection detecting means for detecting the connection of an operating section to the body to output a connection detection signal when connection has been detected; and control means for making the connection of the contacts of the body and the contacts of the operating section effective a predetermined period of time after generation of the connection detection signal.

In the electronic device according to the invention, the control means makes the electrical connection of the contacts of the body and the contacts of the operating section effective a predetermined period of time after the production of the connection detection signal indicating the connection of the operating section to the body.

Hence, even if an input key or keys are operated during connection of the operating section to the body, the input from the operating section is not received during the predetermined period of time starting from the time instant the contacts of the operating section are engaged with those of the body. Therefore, even if an input key or keys are operated accidentally or carelessly when the operating section is being connected, the body is not operated.

BRIEF DESCRIPTION OF THE DRAWINGS

FIG. 3 is a flow chart showing a description of the operation of a control section in the electronic device.

DETAILED DESCRIPTION OF THE PREFERRED EMBODIMENT

One preferred embodiment of this invention will be described with reference to the accompanying drawings.

Figure 1:
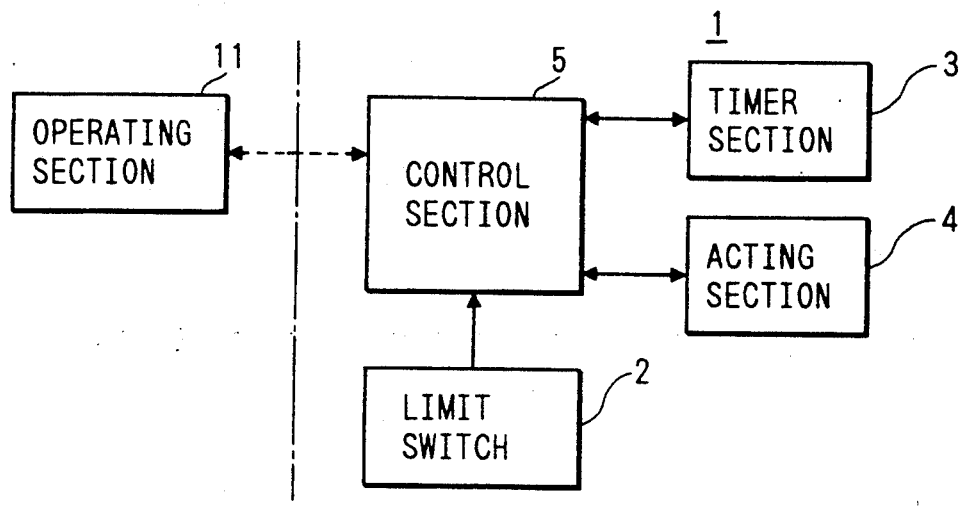
FIG. 1 is a block diagram outlining the arrangement of one embodiment of an electronic device, according to this invention.

FIG. 1 is a block diagram outlining the arrangement of an electronic device, i.e., the embodiment of the invention. In FIG. 1, reference numeral 1 designates a body of the device; and 11, an operating section of the device which is detachably connected to the body.

The body 1 comprises: a connection detecting section, namely, a limit switch 2 which detects the connection of the operating section 11 to the body 1 to output a connection detection signal, and which also detects the disconnection of the operating section 11 to output a disconnection detection signal; a timer section 3 for measuring time; an acting section 4 for actually carrying out a requested operation, i.e., playing a disk; and a control section 5 for controlling the timer section 3, the acting section 4 and the operating section 11 according to the outputs of the limit switch 2.

The term "acting section 4" as used herein is intended to mean, for example, the loading section, the playback section, etc. of a disk player, or a like electronic device, installed in a vehicle.

Figure 2:
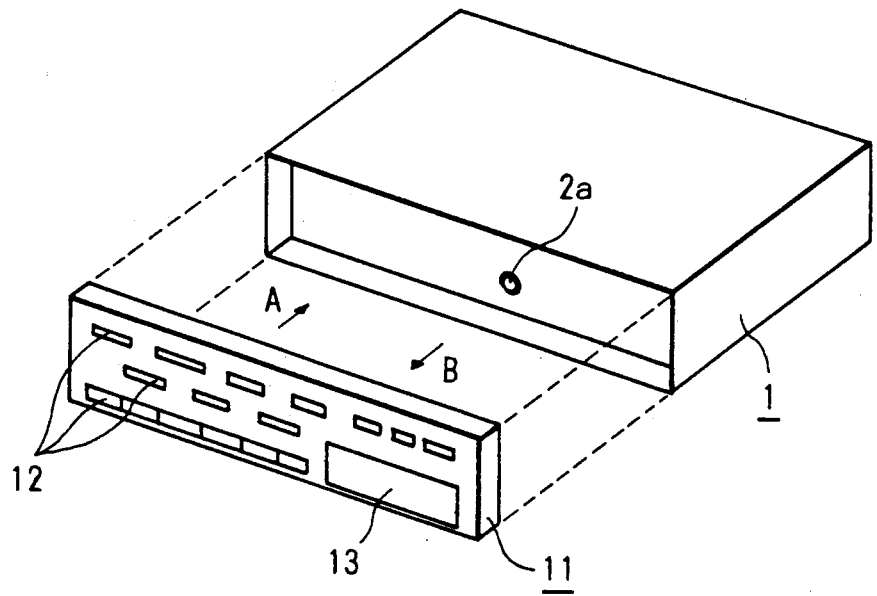
FIG. 2 is a perspective view showing the external appearances of a body and an operating section of the electronic device of the present invention.

FIG. 2 is a perspective view showing the external appearances of the body 1 and the operating section 11. The operating section 11 has a plurality of input keys 12 for inputting various data, and a display section 13 for displaying operation modes, for instance.

In FIGS. 1 and 2, are contacts of the body 1 and the contacts of the operating section 11 are not shown; however, it should be noted that the body 1 has its contacts on its front end, and the operating section 11 has its contacts on its rear end, in such a manner that those contacts are electrically connected when operating section 11 is connected to the body 1.

In FIG. 2, reference character 2a designates the push button of the limit switch 2.

The connection and disconnection of the operating section 11 will now be described.

When the operating section 11 is engaged with the body 1 by moving it in the direction of the arrow A in FIG. 2, the rear end of the operating section 11 pushes the push button 2a of the limit switch 2, so that the latter outputs the connection detection signal, and the contacts of the operating section 11 are electrically connected to the contacts of the body 1.

When, under this condition, the operating section 11 is disengaged from the body 1 by moving the operating section in the direction of the arrow B in FIG. 2, the rear end of the operating section 11 releases the push button 2a of the limit switch 2, so that the latter 2 outputs the disconnection detection signal, and the contacts of the operating section 11 are electrically disconnected from the contacts of the body 1.

Now, the operation of the control section 5 will be described in conjunction with the flowchart of FIG. 3.

When the operating section 11 is connected to the body 1 in the above-described manner, the control section 5 operates as follows. Upon reception of the connection detection signal from the limit switch 2 (Step St1), the control section 5 resets and starts the timer section 3 (Step St2), and waits for a predetermined period of time, for instance five (5) seconds, according to the output of the timer section 3 (Step St3). After the predetermined period has lapsed, the control section operates to make the electrical connection of the contacts effective so that the output or outputs of the operating section 11 are received, such output or outputs being provided by operating the input key or keys 12 (Step St4).

The control section 5 determines from an output of the operating section whether or not an input key 12 has been operated (Step St5). When it is determined that an input key has been operated, a processing routine is effected in which the acting section 4 is controlled in correspondence with the particular input key 12 operated (Step St6).

After Step St6, or if it is determined in Step St5 that no input key has been operated, it is determined from the output signal of the limit switch 2 whether or not the operating section 11 has been disconnected from the body (Step St7). That is, it is detected whether or not the limit switch 2 has produced a disconnection detection signal. When it is determined that the operating section has not been disconnected, Step St5 is effected again. When it is determined that the operating section has been disconnected, Step St1 is effected again, after the reception of inputs through the contacts is inhibited (Step St8).

As was described above, in the embodiment, the connection of the contacts is not made effective; that is, the output or outputs of the operating section provided by operating the input key or keys 12 are not received for a predetermined period of time starting from the time instant the operating section 11 is connected to the body 1. Hence, when the input key or keys 12 of the operating section 11 are operated accidentally or carelessly during the connection of the operating section to the body, the acting section 4 of the body is not operated for the predetermined period of time.

The technical concept of the invention is most effectively applicable to an electronic device for use in a vehicle, because there is a tendency with respect to such an electronic device to have its body miniaturized and, accordingly, the operating section is also miniaturized as much as possible, and therefore the input key or keys 12 are unavoidably operated during connection of the operating section 11 to the body 1.

In the above-described embodiment, the limit switch 2 is employed to detect the connection or disconnection of the operating section; however, it may be replaced by a photosensor, for instance, which can similarly detect the connection or disconnection of the operating section. Element 2a in FIG. 2 can be considered either a push button of a limit switch or a photosensor.

Furthermore, in the above-described embodiment, the acting section 4 is controlled by the control section 5. However, the same effect can be obtained by connecting between the contacts of the control section 5 and the remainder of the body 1 a switching element which functions in the same way, i.e., turning on according to the output of the timer section 3 which is provided, for example, in five (5) seconds. It goes without saying that, in this case, immediately when the connection detecting means applies the disconnection detection signal to the control section 5, the switching element is turned off.

While the invention has been described with reference to a vehicle's electronic device, the technical concept of the invention can be applied to other electronic devices.

As was described above, in the invention, the connection between the contacts of the body and the contacts of the operating section is made effective a predetermined period of time after the production of the connection detection signal which is provided when the operating section is connected to the body. Therefore, when the input key or keys are operated accidentally or carelessly during connection of the operating section to the body, the body will not be operated for the predetermined period of time.

What is claimed is:

1. An electronic device having an operating section which has a plurality of input keys and which is detachably connected to a body of said electronic device in such a manner that said operating section is electrically connected to said body, characterized in that said body comprises:
    connection detecting means for detecting the connection of said operating section to said body and for outputting a connection detection signal when such connection has been detected; and
    control means responsive to said connection detection signal for making the electrical connection between said body and said operating section effective a predetermined period of time after said connection detection means provides said connection detection signal, for preventing the electrical connection between said operating section and said body from being accidently operated while said operating section is being connected to said body.

2. A device as claimed in claim 1 further characterized in that said connection detecting means involves a push button.

3. A device as claimed in claim 1 further characterized in that said connection detecting means involves a photosensor.

4. A device as claimed in claim 1 further characterized in that said predetermined period of time is five seconds.

5. An electronic device comprising:
    operating section means for providing commands to said device by means of manual keys; and
    body section means for receiving and carrying out said commands; wherein said body section comprises:
    connection detecting means for detecting a physical connection between said operating section means and said body section means; and for outputting a connection detection signal when such connection has been detected;
    timer means for producing a timer output signal a predetermined period of time after said connection detecting means detects said physical connection; and
    control section means responsive to said connection detection signal for allowing said body section means to receive and carry out said commands upon production of said timer output signal, for preventing an electrical connection between said operating section and said body section means from being accidently operated while said operating section is being connected to said body section means.

* * * * *